(12) United States Patent
Fuwa

(10) Patent No.: US 6,792,914 B2
(45) Date of Patent: Sep. 21, 2004

(54) CONTROL SYSTEM AND METHOD FOR INTERNAL COMBUSTION ENGINE HAVING VARIABLE VALVE ACTUATION SYSTEM

(75) Inventor: Naohide Fuwa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/664,922

(22) Filed: Sep. 22, 2003

(65) Prior Publication Data

US 2004/0060540 A1 Apr. 1, 2004

(30) Foreign Application Priority Data

Sep. 26, 2002 (JP) ........................................ 2002-281024

(51) Int. Cl.[7] .............................. F01L 1/34; F02D 9/08; F02D 41/04
(52) U.S. Cl. .................................... 123/399; 123/90.15
(58) Field of Search ................................ 123/346, 399, 123/403–405, 90.11, 90.15, 90.16; 701/103, 105

(56) References Cited

U.S. PATENT DOCUMENTS

| | | | | | |
|---|---|---|---|---|---|
| 5,546,907 | A | * | 8/1996 | Komoriya et al. | 123/478 |
| 5,644,073 | A |   | 7/1997 | Matsuno et al. | 123/90.15 |
| 6,234,144 | B1 | * | 5/2001 | Yamaguchi et al. | 123/399 |
| 6,308,671 | B1 | * | 10/2001 | Reed et al. | 123/90.15 |
| 6,349,592 | B1 | * | 2/2002 | Hirasawa et al. | 73/118.1 |
| 6,378,484 | B1 | * | 4/2002 | Russell et al. | 123/295 |
| 6,390,063 | B1 | * | 5/2002 | Obata et al. | 123/399 |
| 6,412,455 | B1 | * | 7/2002 | Ogiso et al. | 123/90.11 |
| 6,502,545 | B1 | * | 1/2003 | Ganser et al. | 123/399 |
| 6,651,619 | B2 | * | 11/2003 | Ogiso | 123/339.11 |
| 2003/0075151 | A1 | * | 4/2003 | Machida et al. | 123/399 |
| 2003/0230277 | A1 | * | 12/2003 | Muto | 123/308 |

FOREIGN PATENT DOCUMENTS

| | | | | |
|---|---|---|---|---|
| JP | A 1-110817 | 4/1989 | | |
| JP | A 4-159426 | 6/1992 | | |
| JP | A 6-317114 | 11/1994 | | |
| JP | A 6-317118 | 11/1994 | | |
| JP | A 6-317129 | 11/1994 | | |
| JP | 170549 | * 7/1996 | ........... | F02D/41/02 |
| JP | A 2000-161124 | 6/2000 | | |
| JP | A 2000-282901 | 10/2000 | | |
| JP | 83116 | * 3/2003 | ........... | F02D/41/04 |

* cited by examiner

Primary Examiner—Hai Huynh
(74) Attorney, Agent, or Firm—Oliff & Berridge, PLC

(57) ABSTRACT

If during a specific steady operation state of an engine, the actual intake pipe pressure is different from a target intake pipe pressure set during the specific steady operation state, a first correction amount for the throttle valve control value is calculated by causing the actual intake pipe pressure to become equal to the target intake pipe pressure. If at this time the actual amount of intake air is still different from a target amount of intake air set during the specific steady operation state, a second correction amount for the variable valve control value is calculated by causing the actual amount of intake air to become equal to the target amount of intake air. The second correction amount is used to further correct the throttle valve control value corrected by the first correction amount.

7 Claims, 5 Drawing Sheets

CONTROL SYSTEM AND METHOD FOR INTERNAL COMBUSTION ENGINE HAVING VARIABLE VALVE ACTUATION SYSTEM

INCORPORATION BY REFERENCE

The disclosure of Japanese Patent Application No. 2002-281024 filed on Sep. 26, 2002, including the specification, drawings and abstract is incorporated herein by reference in its entirety.

BACKGROUND OF INVENTION

1. Field of the Invention

The invention relates to control system and method for an internal combustion engine having a variable valve actuation system

2. Description of the Related Art

There is a known internal combustion engine having a variable valve actuation system that controls the amount of intake air by changing the open valve duration of the intake valves while keeping the throttle valve fully open so as to avoid pumping loss. In order to a accurately control the amount of intake air in such an internal combustion engine, the control instruction value for controlling the open valve duration of the intake valves needs to accurately correspond to the amount of intake air. To this end, a related-art technology holds the throttle valve at a set degree of opening, and changes the open valve duration of the intake valves on the basis of the control instruction value, and corrects the reference control instruction value on the basis of the negative pressure that occurs in the intake pipe (e.g., see Japanese Patent Application Laid-open Publication No. 6-317129).

According to the related-art technology, it is considered that the reference control instruction value is corrected on the basis of the intake pipe negative pressure that corresponds to the actual amount of intake air, and therefore that if the thus-corrected control instruction value is used as a basis for the control of the open valve duration of the intake valves, the amount of intake air can be accurately controlled.

In the related-art technology, the throttle valve does not cooperate with on an accelerator pedal, but the degree of opening of the throttle valve can be freely adjustable. As for this type of throttle valve, however, the actual degree of throttle valve opening fixed for correction of the reference control instruction value may be different from the set degree of opening. In such a case, the reference control instruction value cannot be accurately corrected, since the intake pipe negative pressure greatly changes depending on the degree of throttle valve opening as well. As a result, the control of the amount of intake air become inaccurate.

SUMMARY OF THE INVENTION

Accordingly, it is an object of the invention to enable accurate control of the amount of intake air in an internal combustion engine having a variable valve actuation system in which a throttle valve whose degree of opening is adjustable is provided, and an amount of intake air is controlled by changing the degree of opening of the throttle valve and changing at least one of the open valve duration of an intake valve and the amount of lift of the intake valve via the variable valve actuation system.

An aspect of the invention provides a control method for an internal combustion engine having (i) a throttle valve whose degree of opening is adjustable, and (ii) a variable valve actuation system which includes an intake valve and enables the degree of opening of the intake valve to be variably changed, where an amount of intake air is controlled by changing at least one of an open valve duration of the intake valve and an amount of lift of the intake valve based on a pre-set variable valve control value and by changing the degree of opening of the throttle valve based on a pre-set throttle valve control value in accordance with a state of operation of the engine. The control method is characterized as follows. That is, if during a specific steady operation state, an actual intake pipe pressure is different from a target intake pipe pressure set during the specific steady operation state, a first correction amount for one of the throttle valve control value and the variable valve control value is calculated by changing the one of the throttle valve control value and the variable valve control value so that the actual intake pipe pressure becomes equal to the target intake pipe pressure. If at this time the actual amount of intake air is still different from a target amount of intake air set during the specific steady operation state, a second correction amount for another one of the throttle valve control value and the variable valve control value is calculated by changing the another one of the throttle valve control value and the variable valve control value so that the actual amount of intake air becomes equal to the target amount of intake air. The second correction amount is used to further correct the one of the throttle valve control value and the variable valve control value corrected by the first correction amount.

In a preferred form of the above-described control method, the first correction amount and the second correction amount are updated.

In a another preferred form of the above-described control method, it is determined that the throttle valve or the variable valve actuation system has a fault, if the first correction amount is outside a threshold value range or if the second correction amount is outside a threshold value range.

Another aspect of the invention provides a control system for an internal combustion engine, which includes (i) a throttle valve whose degree of opening is adjustable, (ii) a variable valve actuation system that includes an intake valve and enables the degree of opening of the intake valve to be variably changed; and (iii) a controller that controls an amount of intake air by changing at least one of an open valve duration of the intake valve and an amount of lift of the intake valve based on a pre-set variable valve control value and by changing the degree of opening of the throttle valve based on a pre-set throttle valve control value in accordance with a state of operation of the engine. According to this system, if during a specific steady operation state, an actual intake pipe pressure is different from a target intake pipe pressure set during the specific steady operation state, the controller calculates a first correction amount for one of the throttle valve control value and the variable valve control value by changing the one of the throttle valve control value and the variable valve control value so that the actual intake pipe pressure becomes equal to the target intake pipe pressure. At this time, if the actual amount of intake air is different from a target amount of intake air set during the specific steady operation state, the controller calculates a second correction amount for another one of the throttle valve control value and the variable valve control value by changing the another one of the throttle valve control value and the variable valve control value so that the actual amount of intake air becomes equal to the target amount of intake air. Also, the controller uses the second correction amount to further collect the one of the throttle valve control value and the variable valve control value corrected by the first correction amount.

In a preferred form of the above-described control system, the controller is adapted to update the first correction amount and the second correction amount.

In another preferred form of the above-described control system, the controller is adapted to determine that the throttle valve or the variable valve actuation system has a fault, if the first correction amount is outside a threshold value range or if the second correction amount is outside a threshold value range.

In a preferred form of the above-described control system, the controller is adapted to, if the fast correction amount is outside a threshold value range or if the second correction amount is outside a threshold value range, correct the degree of opening of the throttle valve or at least one of the open valve duration of the intake valve and the amount of lift of the intake valve with a guard such that the first or second correction amount calculated at this time will not become outside a threshold value range that is narrower than the threshold value range used for the fault determination.

BRIEF DESCRIPTION OF THE DRAWINGS

The foregoing and or ether objects, features and advantages of the invention will become more apparent from the following description of preferred embodiments with reference to the accompanying drawings, in which like numerals are used to represent like elements and wherein.

DETAILED DESCRIPTION OF PREFERRED EMBODIMENTS

Figure 1:
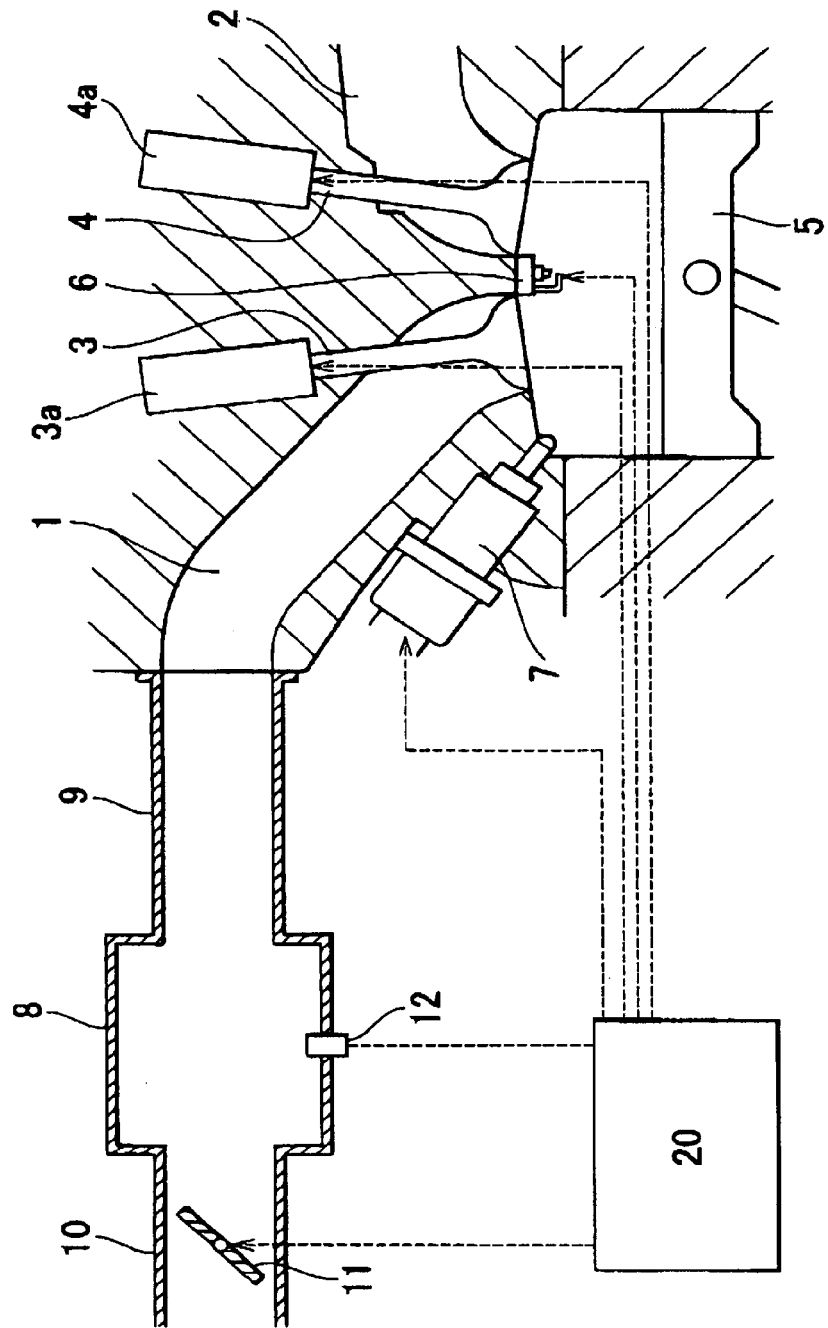
FIG. 1 is a schematic sectional view of an internal combustion engine having a variable valve actuation system to which control system and method according to one embodiment of the invention are applied.

FIG. 1 is a schematic sectional view of an internal combustion engine having a variable valve actuation system to which control system and method according to the invention are applied. Referring to FIG. 1, an intake port 1 and an exhaust port 2 communicate with the interior of a cylinder via an intake valve 3 and an exhaust valve 4, respectively. A piston 5 is provided in the cylinder. An ignition plug 6 is disposed substantially at a center of an upper portion of the cylinder. A fuel injection valve 7 is provided in an upper peripheral portion of the cylinder so as to inject fuel directly into the cylinder.

A common surge tank 8 for all the cylinders is connected to the intake port 1 of each cylinder via an intake pipe 9. An intake passageway 10 extending upstream of the surge tank 8 is provided with a throttle valve 11. The throttle valve 11 is not a type of throttle valve that cooperates with an accelerator pedal, but a type of throttle valve whose degree of opening is freely adjustable via a drive device such as a stepping motor or the like. A pressure sensor 12 is disposed downstream of the throttle valve 11 so as to detect the pressure in the surge tank 8. Furthermore, an air flow meter (not shown) for detecting the amount of intake air is disposed in the intake passageway 10 upstream of the throttle valve 11.

The operation of the injection valve 7, the throttle valve 11, the intake and exhaust valves 3, 4 is controlled by an ECU 20. The ECU 20 includes a CPU, as its main component, ROM, RAM, signal input port, signal output port, etc., which are all connected via a bidirectional bus, and is thus formed as a computer.

The fuel injection valve 7 is designed so that fuel can be injected into the cylinder during the intake stroke so as to form a homogeneous mixture in the cylinder and therefore accomplish homogeneous combustion. For the homogeneous combustion, the fuel injection valve 7 injects fuel directly into the cylinder, so that injected fuel is reliably supplied into the cylinder. Therefore, the amount of fuel injected can be minimized. The fuel injection valve 7 may instead be disposed in the intake pipe 9, in order to accomplish homogeneous combustion.

To accomplish homogeneous combustion, the amount of intake air is controlled to a target amount of intake air corresponding to the state of operation of the engine. Fuel is injected in an amount that, together with the target amount of intake air, will achieve a desired air-fuel ratio in accordance with the state of operation of the engine. The state of operation of the engine is mainly determined by the amount of depression of the accelerator pedal and the engine rotation speed. The target amount of intake air is set so as to increase in accordance with the state of operation of the engine, that is, with increases in the amount of depression of the accelerator pedal, or with increases in the engine rotation speed. In general, the amount of intake air is controlled through the use of the throttle valve 11 alone. For example, if the degree of opening of the throttle valve 11 becomes small during a low-load engine operation, the downstream side of the throttle valve 11 has a relatively great negative pressure, so that a pumping loss occurs and therefore the fuel economy diminishes.

In this embodiment, however, the amount of intake air is controlled through the control of the open valve duration of the intake valve 3 in addition to the control of the degree of opening of the throttle valve 11. Therefore, the degree of opening of the throttle valve 11 does not become very small even during low-load engine operation. Thus, the pumping loss is mitigated.

It is also conceivable to always keep the throttle valve 11 fully open and control the amount of intake air on the basis of the open valve duration of the intake valve 3 alone. However, injected fuel more readily vaporizes in the case where the pressure at the downstream side of the throttle valve 11 is set slightly below the atmospheric pressure so as to provide negative pressure in the cylinder. In that case, therefore, good homogeneous combustion is realized and therefore fuel economy improves.

Figure 2:
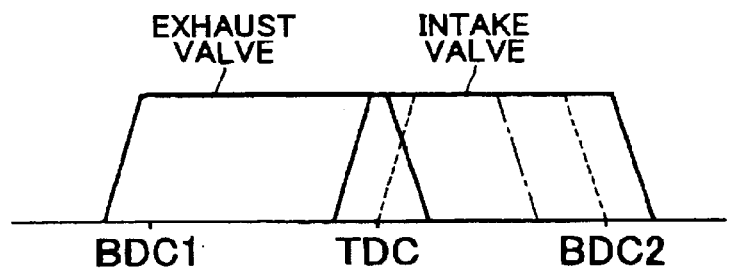
FIG. 2 is a time chart indicating the amounts of lift of an exhaust valve and an intake valve.

In the embodiment, the intake valve 3 and the exhaust valve 4 are opened and closed by electromagnetic actuators 3a and 4a, respectively, so that the opening and closing timings of the valves can be freely changed. FIG. 2 is a time chart indicating the amounts of lift of the exhaust valve and the intake valve. In this time chart, the exhaust valve 4 is opened immediately prior to the expansion bottom dead center BDC1, and is closed immediately following the exhaust top dead center TDC. The intake valve 3, when the largest amount of intake air is targeted, is opened immediately prior to the exhaust top dead center TDC, and is closed immediately following the intake bottom dead center BDC2 as indicated by a solid line in FIG. 2. For decreased target amounts of intake air, the opening timing of the intake valve 3 is gradually retarded toward the exhaust top dead center TDC as indicated by a dashed line, and the closing timing of the intake valve 3 is gradually advanced toward the exhaust top dead center TDC as indicated by a dashed line and a one-dot chain line. By shortening the open valve duration of the intake valve 3 in this manner, the amount of intake air can be reduced.

Figure 5:
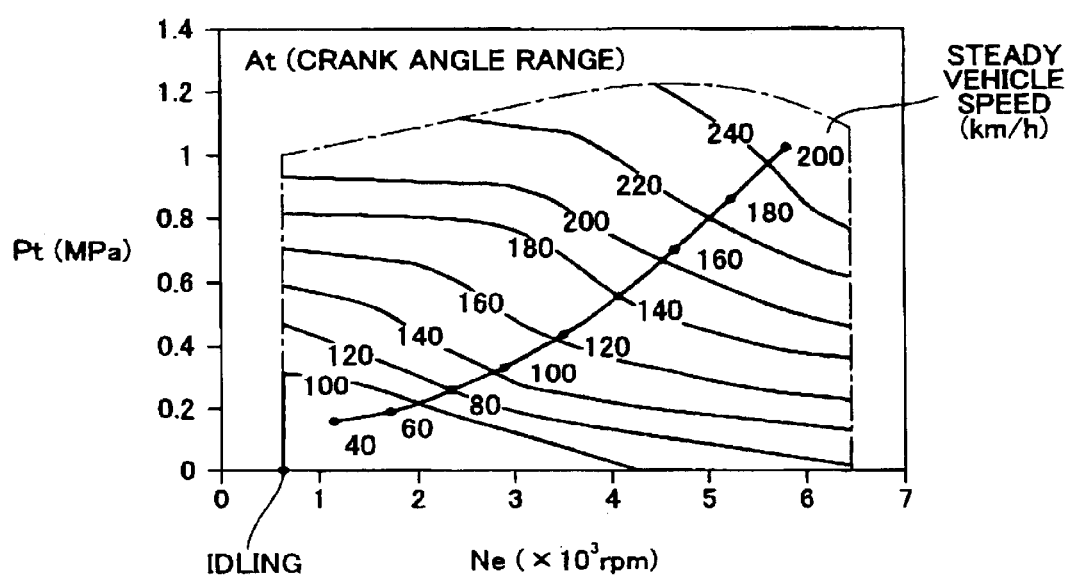
FIG. 5 shows a first map for determining a target open valve duration of the intake valve.
Figure 6:
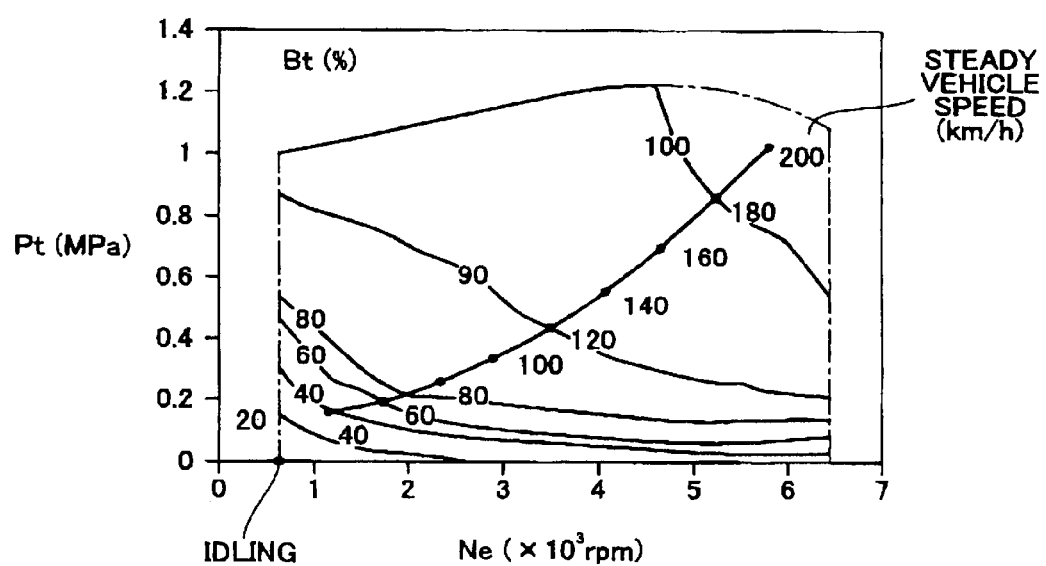
FIG. 6 shows a second map for determining a target degree of opening of a throttle valve.

FIG. 5 shows a first map indicating the target open valve duration At of the intake valve 3 determined by the engine rotation speed Ne and the target intake pipe pressure Pt that is set progressively higher with increases in the target amount of intake air Qt separately for various engine rotation speeds Ne. FIG. 6 shows a second map indicating the target degree of opening Bt of the throttle valve 11 determined by the target intake pipe pressure Pt and the engine rotation speed Ne.

If the target open valve duration At of the intake valve 3 is achieved by a control instruction value for the target open valve duration At which is given to the electronic actuator 3a, and if the target degree of opening Bt of the throttle valve 11 is achieved by a control instruction value for the target degree of opening Bt which is given to the throttle valve drive device, the intake pipe pressure can be brought to a desired negative pressure (target intake pipe pressure Pt) corresponding to the state of engine operation, and a desired amount of intake air (target amount of intake air Qt) can be supplied into the cylinder. Therefore, good homogeneous combustion can be accomplished without causing great pumping loss, and the fuel consumption can be minimized. However, in some cases, the control instruction value determined for the target open valve duration At cannot achieve the target open valve duration At of the intake valve 3, or the control instruction value determined for the target degree of opening Bt cannot achieve the target degree of opening Bt of the throttle valve 11. In such cases, the cylinder is not supplied with a desired amount of intake air, so that an intended state of engine operation cannot be brought about and the fuel economy diminishes.

Figure 3:
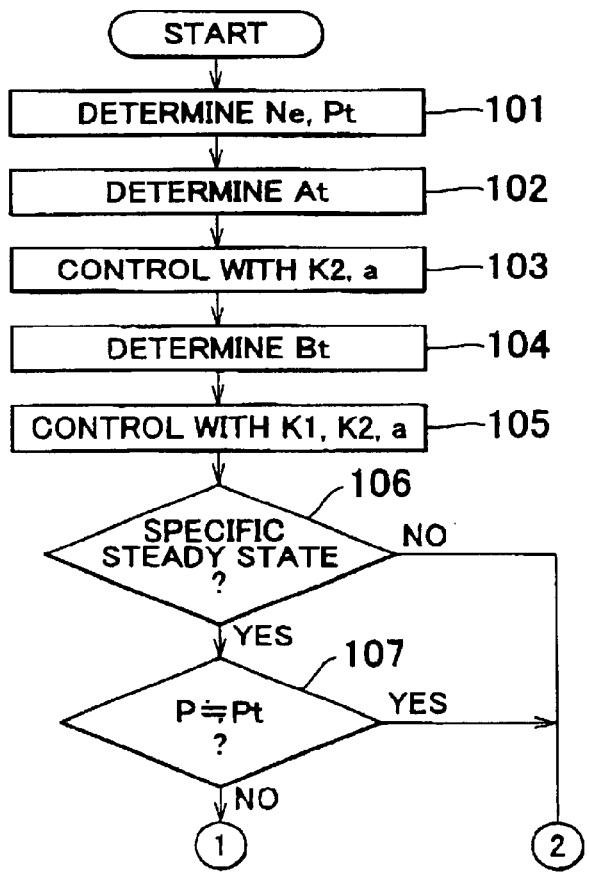
FIG. 3 is a portion of a flowchart illustrating a process for controlling the amount of intake air.
Figure 4:
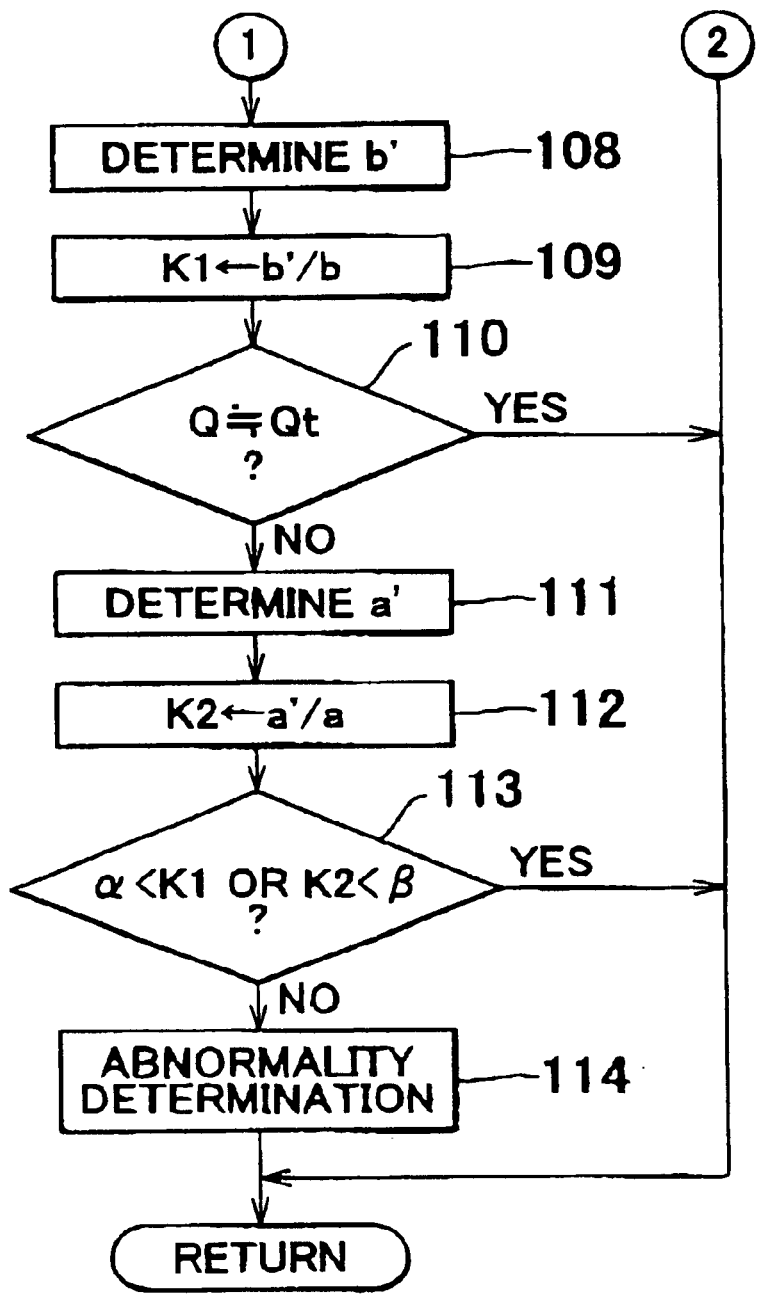
FIG. 4 is the rest of the flowchart illustrating the process for controlling the amount of intake air.

According to the embodiment, in order to ensure the supply of desired amount of intake air into the cylinder and therefore minimize the fuel consumption, a control of the open valve duration of the intake valve 3 and a control of the degree of opening of the throttle valve 11 are executed as illustrated by the flowchart shown in FIGS. 3 and 4. First in step 101, the engine rotation speed Ne is detected, and a target intake pipe pressure Pt is determined on the basis of die engine rotation speed Ne and the target amount of intake air Qt determined from the engine rotation sped Ne and the amount of depression of the accelerator pedal. Subsequently in step 102, a target open valve duration At of the intake valve 3 is determined from the engine rotation speed Ne and the target intake pipe pressure Pt with reference to the first map shown in FIG. 5. Subsequently in stop 103, the control instruction value a for the electric actuator 3a of the intake valve 3 which is initially set with respect to the target open valve duration At is corrected by multiplication by a second correction factor k2, and the corrected control instruction value is used to operate the electronic actuator 3a. The second correction factor k2 is calculated in a step described below, and is initially set at "1".

Subsequently in step 104, a target degree of opening Bt of the throttle valve 11 is determined from the engine rotation speed Ne and the target intake pipe pressure Pt with reference to the second map shown in FIG. 6. In step 105, the control instruction value b for the throttle valve drive device which is initially set with respect to the target degree of opening Bt is corrected by multiplication by a first corrosion factor k1 and the aforementioned second correction factor k2, and the thus-corrected control instruction value is used to operate the drive device of the throttle valve 11.

If the initially set control instruction value a for the electronic actuator 3a and the initially set control instruction value b for the throttle valve drive device will achieve the target open valve duration At of the intake valve 3 and the target degree of opening Bt of the throttle valve 11, it is appropriate that the first correction factor k1 and the second correction factor k2 be "1"; that is, there is no need to correct the control instruction values a, b. However, if the target open valve duration At of the intake valve 3 and the target degree of opening Bt of the throttle valve 11 are not reached, the target intake pipe pressure Pt will not be achieved, so that the target amount of intake air Qt will not be supplied into the cylinder.

In step 106 in the flowchart, it is determined whether the present state of engine operation is a specific steady state. If the present engine operation state is the specific steady state, it is then determined in step 107 whether the target intake pipe pressure Pt has been reached. The specific steady state may be any steady operation state of the engine where the amount of intake air is stable. The determination at step 107 is made by determining whether the pressure P in the sure tank 8 detected by the pressure sensor 12 is substantially equal to the target intake pipe pressure Pt. Specifically, it is determined whether a deviation between the target intake pipe pressure Pt and the pressure P in the surge tank 8 detected by the pressure sensor 12 is less than a set value. If the determination is affirmatively made, the correction of the correction inspection values a, b is unnecessary, and the process immediately ends. Conversely, if the aforementioned deviation is greater than or equal to the set value and therefore it is determined that the actual pressure P in the surge tank 8 is apparently unequal to the target intake pipe pressure Pt, the process proceeds to step 108.

In step 108, the degree of opening of the throttle valve 11 is adjusted so that the pressure P in the surge tank 8 becomes equal to the target intake pipe pressure Pt, that is, so that the deviation between the pressure P and the target intake pipe pressure Pt becomes less than the set value. The control instruction value b' for the throttle valve drive device at the time of completion of the adjustment is determined. Subsequently in step 109, the control instruction value b' is divided by the initial control instruction value b to determine the first correction factor k1.

If the target amount of intake air Qt should be supplied into the cylinder after this correction of the degree of opening of the throttle valve 11, it will turn out that only the control instruction value for the drive device of the throttle valve 11 has deviated. Therefore, it is determined in step 110 whether the amount of intake air Q detected by the air flow meter is substantially equal to the target amount of intake air Qt. Specifically, it is determined whether a deviation between the amount of intake air Q detected by the air flow meter and the target amount of intake air Qt is less than a set value. If the determination is affirmatively made, only the first correction factor k1 is corrected (step 109), and then the process ends.

Conversely, if the determination at step 110 is negatively made, it turns out that the target open valve duration At of the intake valve 3 has not exactly been reached. Therefore, in step 111, the open valve duration of the intake valve 3 is changed and adjusted so that the actual amount of intake air Q becomes equal to the target amount of intake air Qt, that is, so that the deviation between the amount of intake air Q and the target amount of intake air Qt becomes less than the set value. The control instruction value a' for the electronic actuator 3a at the time of completion of the adjustment is determined. Subsequently instep 112, this control instruction value a' is divided by the initial control instruction value a to determine the second correction factor k2.

Subsequently in step 113, it is determined whether at least one of the first correction factor k1 and the second correction factor k2 is within a threshold value range ($\alpha$ to $\beta$). If the determination is affirmatively made, the process immediately ends. Conversely, if the determination at step 113 is negatively made, it is considered that at least one of the electronic actuator 3a (i.e., a variable valve actuation device of the intake valve 3), the intake valve 3 itself, the drive device of the throttle valve 11, and the throttle valve 11 itself has an abnormality, and needs repair. Then in step 114, the existence of an abnormality is determined, and is indicated to a driver or the like via a lamp or the like.

According to the flowchart, in the case where the target intake pipe pressure Pt has not been reached due to deviation of only the control instruction value for the electronic actuator 3a, the degree of opening of the throttle valve 11 is also changed although the target degree of opening Bt has been reached. However, even though the first correction factor k1 for the control instruction value b for the throttle valve 11 is calculated, the initial control instruction value b for the throttle valve 11 will not be unnecessarily corrected since the correction of the control instruction value b is performed on the basis of not only the first correction factor k1 but also the second correction factor k2 for the control instruction value a for the intake valve 3.

For example, if the actual open valve duration of the intake valve 3 is shorter than the target open valve duration At and the actual intake pipe pressure P is higher than the target intake pipe pressure Pt, the degree of opening of the throttle valve 11 is corrected by the first correction factor k1 being less than "1", to a degree that is smaller than the target degree of opening Bt. However, in this case, since the actual amount of intake air Q is less than the target amount of intake air Qt, the open valve duration of the intake valve 3 is corrected to an increased duration, and thus the second correction factor k2 is greater than "1". Therefore, if the control instruction value b for the throttle valve 11 is corrected by multiplication by the first correction factor k1 and the second correction factor k2, unnecessary correction will not result.

It is to be noted that when the second correction factor k2 is initially calculated, the second correction factor k2 has a value that changes the open valve duration of the intake valve 3 so as to achieve the target amount of intake air Qt while the target degree of opening Bt of the throttle valve 11 has not been reached, and thus does not have an appropriate value. However, if the calculation of the first correction factor k1 and the second correction factor k2 is performed repeatedly while the specific steady state remains, the first correction factor k1 and the second correction factor k2 gradually approach appropriate values.

For example, if, in the above-described case, the process illustrated by the flowchart of FIGS. 3 and 4 is repeated, the determination at step 107 is negatively made since the actual degree of opening of the throttle valve 11 has been less than the target degree of opening Bt and therefore the actual intake pipe pressure P is lower than the target intake pipe pressure Pt. Therefore, in order to increase the degree of opening of the throttle valve 11, the first correction factor k1, made smaller than "1" in the previous cycle of the routine, is increased toward "1". Therefore, the actual amount of intake air Q becomes greater than the target amount of intake air Qt, so that the determination at step 110 is negatively made. Furthermore, the second correction factor k2, set greater than "1" in the previous cycle, is reduced toward "1" so as to shorten the open valve duration of the intake valve 3. As this process is cyclically performed, the first correction on factor k1 and the second correction factor k2 come to assume appropriate values. During this process, the target amount of intake air Qt is always reached. Therefore, an unintended state of operation is not realized. Thus, in order to set the first correction factor k1 and the second correction factor k2 at appropriate values, it is necessary that the specific steady state continue for some time.

Thus, according to the above-described embodiment, every time the engine is operated in the specific steady state, the first correction factor k1 and the second correction factor k2 are updated. These correction factors are also used during states of engine operation other than the specific steady state, as indicated in steps 101 to 105, so that during various states of operation, the target intake pipe pressure can be reached and therefore a desired amount of intake air can be supplied into the cylinder. Practically, the first correction factor k1 and the second correction factor k2 are not very frequently changed. Therefore, the calculation interval may be increased so that, for example, the first correction factor k1 and the second correction factor k2 are calculated during the specific steady state only once before the engine is stopped.

Although in the embodiment, the electronic actuator 3a is employed as a device of the variable valve actuation system for the intake valve 3, the electronic actuator 3a may be replaced by a hydraulic actuator. With such actuators, it is not easy to change the amount of lift of the intake valve 3. In order to reduce the open valve duration of the intake valve 3 and slightly change the amount of lift of the intake valve 3 for control of the amount of intake air in that case, it is appropriate to use a variable valve actuation system in which a cam having an inclined surface with respect to an axis of the camshaft is provided and the position of contact of the cam with the intake valve is changed by moving the camshaft in the directions of the axis. It is also possible to change only the amount of lift of the intake valve 3 in order to control the amount of intake air.

According to the above-described embodiment, if the target intake pipe pressure is not reached, the degree of opening of the throttle valve 11 is changed. Furthermore, if the target amount of intake air is not reached, the open valve duration of the intake valve 3 is changed. However, these operations may be switched as follows. That is, if the target intake pipe pressure is not reached, the open valve duration of the intake valve 3 is changed, and if the target amount of intake air is not reached, the degree of opening of the throttle valve 11 is changed.

Furthermore, according to the above-described embodiment, if at least one of the first correction factor k1 and the second correction factor k2 is outside the common threshold value range ($\alpha$ to $\beta$), it is determined that there is an abnormality. However, it is also possible to set different threshold value ranges for the two correction factors. Still further, if the target intake pipe pressure is not reached, the degree of opening of the throttle valve or the open valve duration of the intake valve is changed. In this occasion, the degree of opening of the throttle valve or the open valve duration of the intake valve may be cowed with a guard such that the correction factor calculated in this case will not become outside a threshold value range that is narrower than the threshold value range used for the determination regarding abnormality.

In a control method for an internal combustion engine having a variable valve actuation system according to the above-described embodiment of the invention, if during a specific steady operation state, the actual intake pipe pressure is different from a target intake pipe pressure set during the specific steady operation state, a first correction amount for one of a throttle valve control value and a variable valve control value is calculated by changing the one of the throttle valve control value and the variable valve control value so that the actual intake pipe pressure becomes equal to the target intake pipe pressure. If at this time the actual amount of intake air is still different from a target amount of intake air set during the specific steady operation state, a second correction amount for another one of the throttle valve control value and the variable valve control value is calculated by changing the another one of the throttle valve control value and the variable valve control value so that the actual amount of intake air becomes equal to the target amount of intake air. The second correction amount is used to further correct one of the throttle valve control value and the variable valve control value corrected by the first correction amount. Therefore, due to the correction by the first correction amount and the second correction amount, the degree of opening of the throttle valve and at least one of the open valve duration of the intake valve and the amount of lift of the intake valve are controlled to their respective target values so as to achieve the target amount of intake air. Thus, it becomes possible to accurately control the amount of intake air.

What is claimed is:

1. A control system for an internal combustion engine, comprising
   a throttle valve whose degree of opening is adjustable;
   a variable valve actuation system that includes an intake valve and enables the degree of opening of the intake valve to be variably changed; and
   a controller that controls an amount of intake air by changing at least one of an open valve duration of the intake valve and an amount of lift of the intake valve based on a pre-set variable valve control value and by changing the degree of opening of the throttle valve based on a pre-set throttle valve control value in accordance with a state of operation of the engine, wherein
   the controller is adapted to:
      if during a specific steady operation state, an actual intake pipe pressure is different from a target intake pipe pressure set during the specific steady operation state, calculate a first correction amount for one of the throttle valve control value and the variable valve control value by changing the one of the throttle valve control value and the variable valve control value so that the actual intake pipe pressure becomes equal to the target intake pipe pressure;
      if at this time the actual amount of intake air is still different from a target amount of intake air set during the specific steady operation state, calculate a second correction amount for another one of the throttle valve control value and the variable valve control value by changing the another one of the throttle valve control value and the variable valve control value so that the actual amount of intake air becomes equal to the target amount of intake air; and
      use the second correction amount to further correct the one of the throttle valve control value and the variable valve control value corrected by the first correction amount.

2. The control system according to claim 1, wherein the controller is adapted to update the first correction amount and the second correction amount.

3. The control system according to claim 1, wherein the controller is adapted to, if the first correction amount is outside a threshold value range or if the second correction amount is outside a threshold value range, determine that the throttle valve or the variable valve actuation system has a fault.

4. The control system according to claim 3, wherein the controller is adapted to, if the first correction amount is outside a threshold value range or if the second correction amount is outside a threshold value range, correct the degree of opening of the throttle valve or at least one of the open valve duration of the intake valve and the amount of lift of the intake valve with a guard such that the first or second correction amount calculated at this time will not become outside a threshold value range that is narrower than the threshold value range used for the fault determination.

5. A control method for an internal combustion engine having (i) a throttle valve whose degree of opening is adjustable, and (ii) a variable valve actuation system which includes an intake valve and enables the degree of opening of the intake valve to be variably changed, where an amount of intake air is controlled by changing at least one of an open valve duration of the intake valve and an amount of lift of the intake valve based on a pre-set variable valve control value and by changing the degree of opening of the throttle valve based on a pre-set throttle valve control value in accordance with a state of operation of the engine, wherein
   if during a specific steady operation state, an actual intake pipe pressure is different from a target intake pipe pressure set during the specific steady operation state, a first correction amount for one of the throttle valve control value and the variable valve control value is calculated by changing the one of the throttle valve control value and the variable valve control value so that the actual intake pipe pressure becomes equal to the target intake pipe pressure;
   if at this time the actual amount of intake air is still different from a target amount of intake air set during the specific steady operation state, a second correction amount for another one of the throttle valve control value and the variable valve control value is calculated by changing the another one of the throttle valve control value and the variable valve control value so that the actual amount of intake air becomes equal to the target amount of intake air, and
   the second correction amount is used to further correct the one of the throttle valve control value and the variable valve control value corrected by the first correction amount.

6. The control method according to claim 5, wherein the first correction amount and the second correction amount are updated.

7. The control method according to claim 5, wherein if the first correction amount is outside a threshold value range or if the second correction amount is outside a threshold value range, it is determined that the throttle valve or the variable valve actuation system has a fault.

* * * * *